Nov. 29, 1949  H. A. WEGNER  2,489,551
SORGHUM HARVESTING MACHINE
Filed June 27, 1945  3 Sheets-Sheet 1
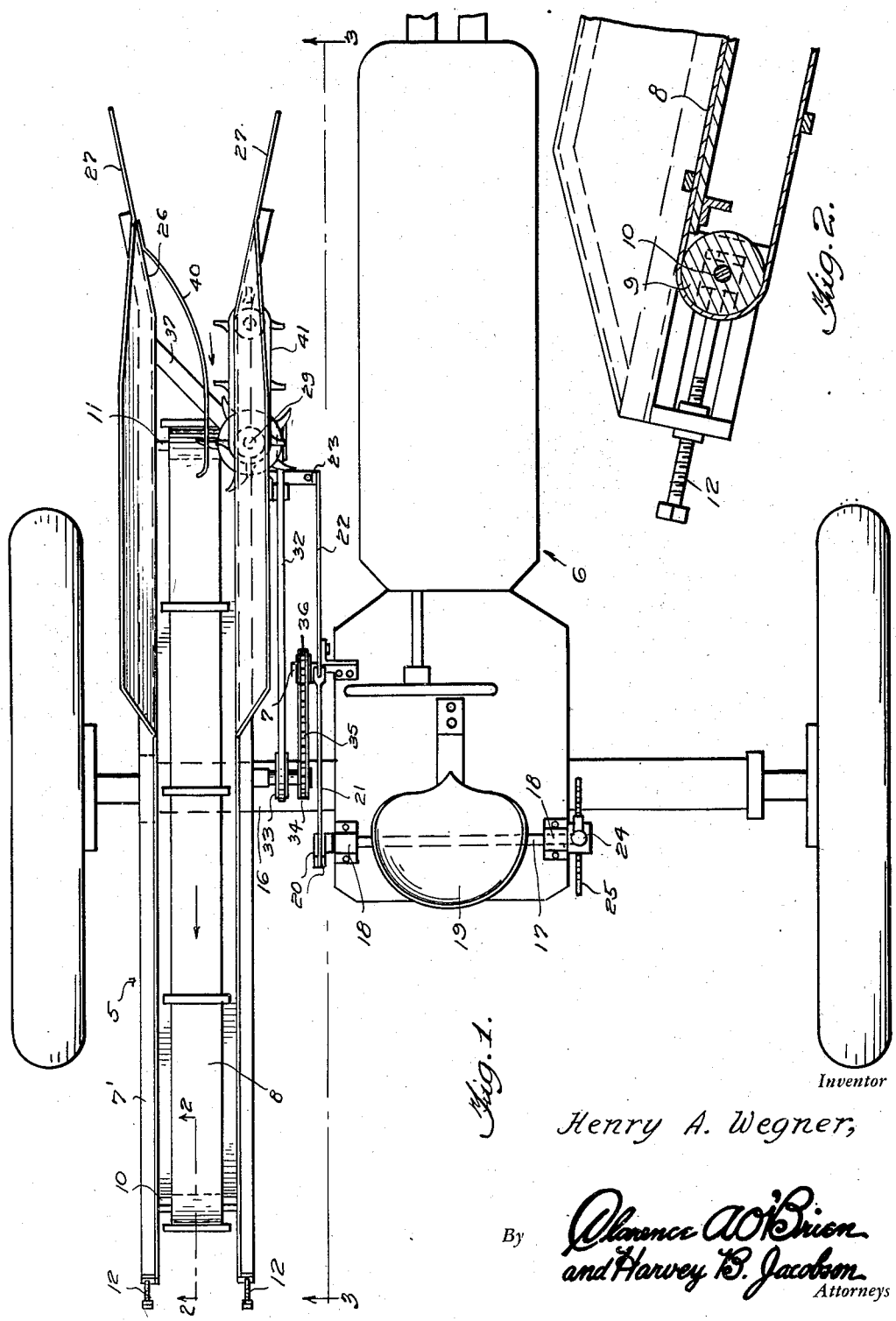
Inventor
Henry A. Wegner,
By Clarence A. O'Brien
and Harvey B. Jacobson
Attorneys Nov. 29, 1949 H. A. WEGNER 2,489,551
SORGHUM HARVESTING MACHINE
Filed June 27, 1945 3 Sheets-Sheet 2

Inventor
Henry A. Wegner,

By Clarence A. O'Brien
and Harvey B. Jacobson
Attorneys

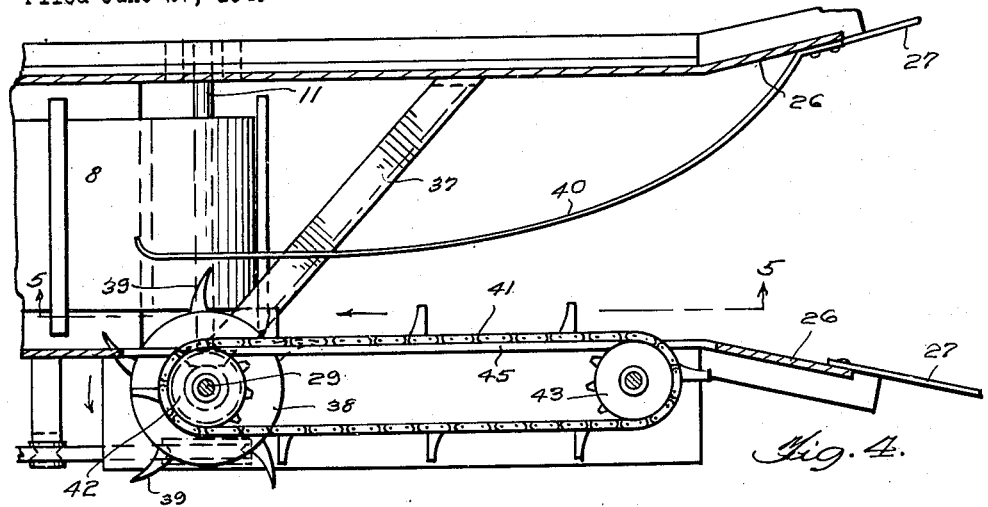

Patented Nov. 29, 1949

2,489,551

UNITED STATES PATENT OFFICE 2,489,551

SORGHUM HARVESTING MACHINE

Henry A. Wegner, Twitty, Tex.

Application June 27, 1945, Serial No. 601,747

2 Claims. (Cl. 56—56)

1

This invention relates to an improved sorghum harvesting machine, and the primary object of the invention is to provide a machine of this kind adapted to gather the standing stalks with the heads or tops thereon, to cut the heads or tops from the gathered stalks and deliver said heads or tops onto the forward end of an inclined conveyor by means of which they may be discharged into a wagon or like receptacle during the travel of the machine.

Another important object of the present invention is to provide a sorghum harvesting machine embodying a conventional agricultural tractor having sorghum harvesting apparatus of the above character mounted longitudinally thereon at one side thereof.

A further object of the invention is to provide a machine of the above kind including cutting means for severing the heads or tops from the stalks, which means is located at one side of the forward end of the conveyor, a gathering chain for crowding the stalks rearwardly to the cutting means, and a guide arm for directing the stalks laterally toward the gathering chain and the cutting means for being effectively acted upon by the latter.

Further objects and features of the invention will become apparent from the following description when considered in connection with the accompanying drawings.

In the drawings:

Figure 1 is a top plan view of an agricultural tractor equipped with sorghum harvesting apparatus constructed in accordance with the present invention.

Figure 2 is an enlarged fragmentary longitudinal section taken on line 2—2 of Figure 1.

Figure 4 is a fragmentary longitudinal section taken on line 4—4 of Figure 3, and drawn on an enlarged scale.

Figure 5 is a vertical longitudinal section taken on line 5—5 of Figure 4.

Figure 6 is an enlarged vertical transverse section taken on line 6—6 of Figure 3.

Figure 3:
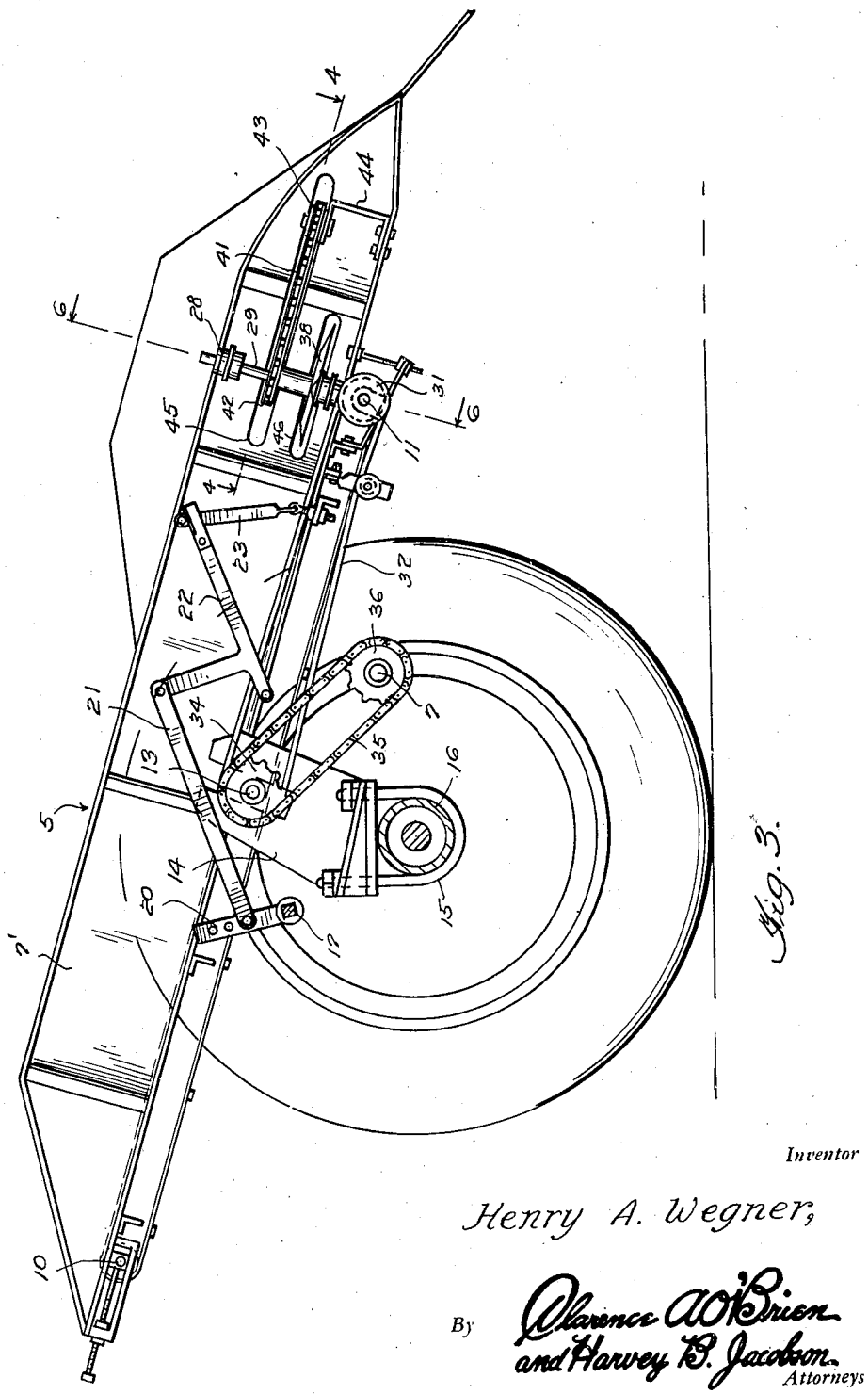
Figure 3 is a longitudinal section taken on line 3—3 of Figure 1.

Referring in detail to the drawings, the present invention contemplates the provision of a sorghum harvesting apparatus 5 mounted longitudinally of and upon one side of a conventional agricultural tractor 6 having a laterally projecting power take-off shaft 7, the harvesting apparatus being arranged to deliver the heads or tops of the sorghum plants into a wagon or like receptacle disposed at the rear of and drawn forwardly by the tractor during the travel of the machine.

The harvesting apparatus includes an inclined conveyor of conventional type having an endless slatted conveying belt 8 passing around rollers 9 provided upon a head shaft 10 and a foot shaft 11. Suitable means is provided, as generally indicated at 12, and detailed in Figure 2, for adjusting the head shaft 10 longitudinally of the frame or body 7' of the conveyor for maintaining the endless conveying belt 8 in a taut condition.

Mounted on the under side of the frame 7' of the conveyor intermediate the ends of the latter is a transverse rock shaft 13 which is journaled in suitable bearing brackets 14 bolted at 15 upon the rear axle housing 16 of the tractor. In this way, the conveyor is mounted for longitudinal tilting movement for adjusting the forward end thereof the desired distance above the ground. Manually operable means is provided for effecting this adjustment, which means includes a transverse horizontal rock shaft 17 journaled on the rear end of the tractor body in bearings 18 so as to extend beneath the driver's seat 19. The end of shaft 17 adjacent the conveyor is operatively connected to the latter forwardly of the rock shaft 13 by means of a crank arm 20, a link 21, a second lever 22 pivoted to a side of the tractor body, and a link 23 connecting the lever 22 with the frame 7' of the conveyor. A hand lever 24 is secured on the other end of shaft 17 beside the tractor seat 19 so as to be within convenient reach of the driver, and said hand lever coacts with a rack segment 25 so that the conveyor is held in any position to which it is tiltably adjusted. Obviously, the means described will raise the forward end of the conveyor when the lever 24 is swung rearwardly and will lower the forward end of the conveyor when said lever 24 is swung forwardly. This enables the driver to adjust the conveyor in accordance with the height of the plants so that only the tops thereof will be severed from the stalks.

The side members of the frame 7' of the conveyor are extended forwardly of the endless conveying belt 8 to provide spaced gathering arms 26 whose forward end portions are disposed in forwardly diverging relation and are provided with diverging forwardly projecting gathering rods 27. The arrangement is such that the standing stalks of the plants are gathered between the sides of the conveyor as the machine travels forwardly.

Journaled in suitable bearings 28 which are secured on the inner side frame member of the conveyor at the rear ends of the gathering arms 26 is an upright shaft 29 whose lower end is operatively connected with the foot shaft 11 by means of a bevel gearing 30, as more clearly shown in Figure 6. Shaft 11 projects inwardly of the gearing 30 where it carries a pulley 31 that is operatively connected by a power transmission belt 32 with a further pulley 33 journaled on the inwardly projecting end portion of rock shaft 13. Fixed to the pulley 33 is a sprocket wheel 34, and a sprocket chain 35 passes around the sprocket wheel 34 and around a further sprocket wheel 36 secured on the power take-off shaft 7 of the tractor.

An obliquely disposed, fixed, horizontal cutter blade 37 is mounted to extend inwardly and rearwardly across the space between the gathering arms 26 directly in front of the endless conveying belt 8, and coacting with this blade or knife 37 is a rotary cutter disc 38 having blades 39 radiating therefrom. Cutter disc 38 is disposed so that its knives 39 wipe across the upper surface of the adjacent end of knife 37 to thereby effectively sever the tops or heads from the standing stalks as they pass rearwardly between the gathering arms 26.

A rearwardly and inwardly extending arm 40 is attached to the gathering arm 26 at the outer side of the conveyor and extends into close proximity to the cutter disc 38 so that the gathered stalks are directed toward the inner side of the conveyor for being effectively passed to the cutting means for being acted upon by the latter. In order to positively press the stalks toward the cutting means as they are thus crowded laterally toward the inner side of the conveyor in advance of the cutting means, the gathering arm 26 at the inner side of the conveyor has a conventional type of fingered gathering chain 41 associated therewith. This gathering chain passes around a sprocket wheel 42 secured on the shaft 29 above the cutting disc 38 and around a further sprocket wheel 43 journaled on a bracket 44 which is mounted on the outer side of the inner side frame member of the conveyor forwardly of shaft 29. Suitable slots are provided at 45 and 46 in the inner side frame member of the conveyor through which the cutter disc 38 and sprocket wheels 42 and 43 project. It will be apparent from the above description that the endless conveying belt 8, cutting disc 38 and gathering chain 41 are all driven from the power take-off shaft 7 of the tractor. and the gearing is such as to drive the gathering chain at a greater speed than the forward travel of the machine.

In the operation, a wagon may be hitched to the rear of the tractor so that the conveyor will discharge into the same. The machine is then driven forwardly with the body of the tractor located between adjacent standing rows of plants. As the machine moves forwardly, the standing plants in one row will be received between the gathering arms 26 and will be directed toward the gathering chain 41 by the arm 40. The gathering chain 41 moves the standing plants rearwardly at a greater speed than the forward travel of the machine and crowds them into operating range of the cutting disc 38 and its coacting knife 37. As the machine continues to travel forwardly, the cutting means severs the heads or tops from the plants and delivers them onto the endless conveying belt 8, the forward end of the conveyor being, of course, adjusted the most desirable distance from the ground in accordance with the height of the plants. The harvested heads or tops of the plants are delivered rearwardly by the conveying element 8 and discharged from the rear end of the conveyor 7 into the wagon for collection. It will be seen that I have provided a compact and efficient sorghum harvesting machine which is comparatively simple in construction and easy to operate. Minor changes may be made in details of construction illustrated and described, such as fall within the scope of the invention as claimed.

What I claim is:

1. A topper attachment for a tractor having a body, a driver's seat mounted on the rear of said body, a rear axle housing, and a power take-off shaft, said topper attachment including bearing brackets adapted to be bolted upon the rear axle housing at said one side of the tractor body, a forwardly inclined conveyor including a frame having side members, roller-carrying transverse horizontal head and foot shafts, and an endless slatted conveying belt passing around the rollers of said head and foot shafts, a transverse horizontal rock shaft mounted on the under side and intermediate the ends of the conveyor frame and journaled in said bearing brackets to mount the conveyor for longitudinal tilting movement, means adapted to be manually operated from the driver's seat of the tractor for tilting the conveyor about the axis of said rock shaft to vertically adjust its forward end relative to the ground, the side members of the conveyor frame extending forwardly of the conveying belt to provide spaced gathering arms having forwardly diverging forward end portions, an upright shaft journaled on the outside of the inner side member of the conveyor frame and geared at its lower end to the conveyor foot shaft, means to provide a driving connection between the tractor power take-off shaft and said foot shaft, an obliquely disposed fixed horizontal cutter blade mounted across the space between the gathering arms directly in front of the conveying belt, a rotary cutter secured on said upright shaft and projecting through the inner side member of the conveyor frame for coacting with said fixed cutter blade, and a rearwardly and inwardly extending arm attached to the outer gathering arm to direct standing stalks laterally inward to the rotary cuttter.

2. The construction defined in claim 1, wherein said means for tilting the conveyor includes a second transverse horizontal rock shaft adapted to be journaled on the rear end of the tractor body, a crank arm secured on one end of said second rock shaft, a bell crank lever adapted to be pivoted to a side of the tractor body, a link connecting said crank arm to one end of said bell crank lever, a second link connecting the other end of said bell crank lever to the conveyor frame, a hand lever secured on the other end of said second rock shaft and adapted to be disposed beside the driver's seat of the tractor, and means to latch the hand lever in adjusted positions.

HENRY A. WEGNER.

REFERENCES CITED

The following references are of record in the file of this patent:

UNITED STATES PATENTS

| Number | Name | Date |
|---|---|---|
| 1,047,031 | Frank et al. | Dec. 10, 1912 |
| 1,445,383 | Biehlen | Feb. 13, 1923 |
| 1,527,699 | Pelland | Feb. 24, 1925 |
| 1,925,975 | Benner | Sept. 5, 1933 |
| 2,139,883 | Curry | Dec. 13, 1938 |
| 2,287,379 | Kiehl | June 23, 1942 |